Mar. 6, 1923.

H. GOTTESMAN

MOTOR VEHICLE CONTROLLING SWITCH

Filed Apr. 27, 1922

WITNESSES

INVENTOR
H. Gottesman
BY
ATTORNEYS

Mar. 6, 1923.
H. GOTTESMAN
1,447,946
MOTOR VEHICLE CONTROLLING SWITCH
Filed Apr. 27, 1922
4 sheets-sheet 2
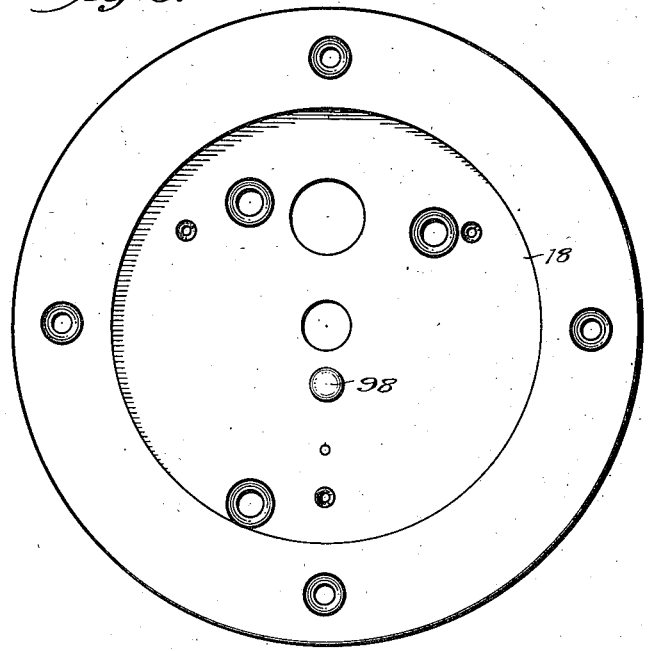
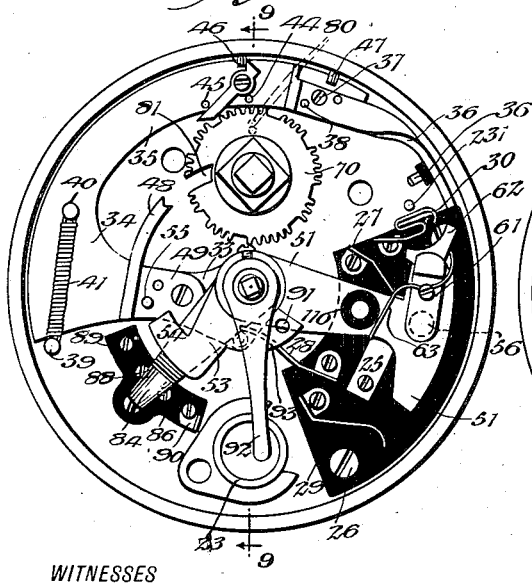
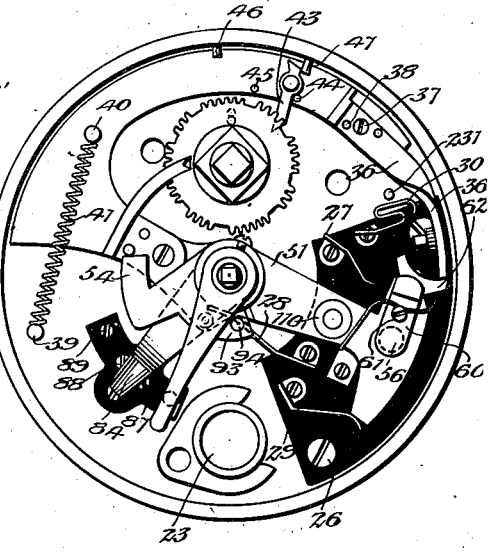
WITNESSES
INVENTOR
H. Gottesman
ATTORNEYS

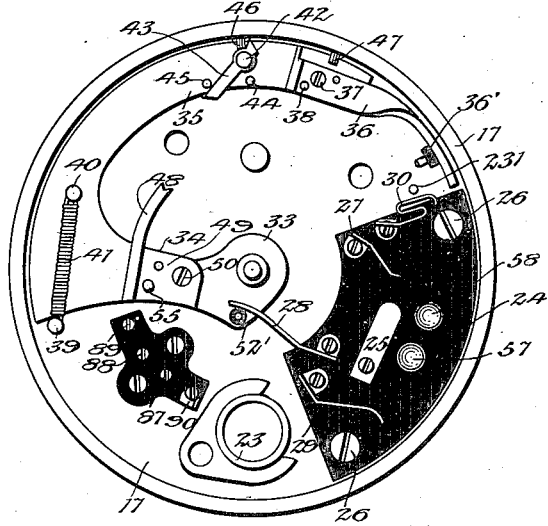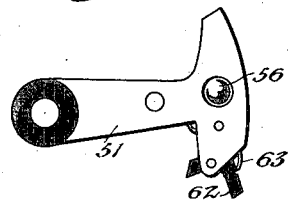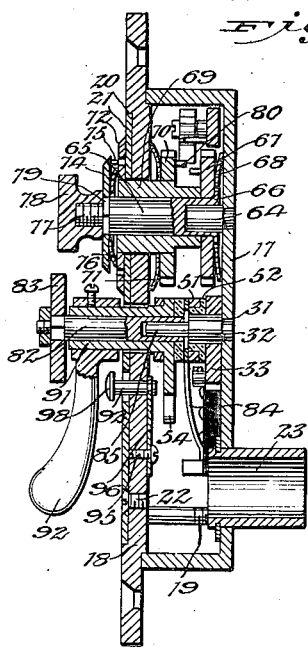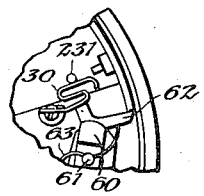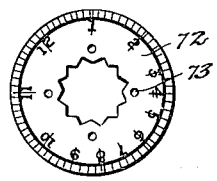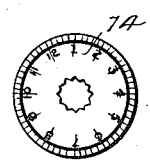

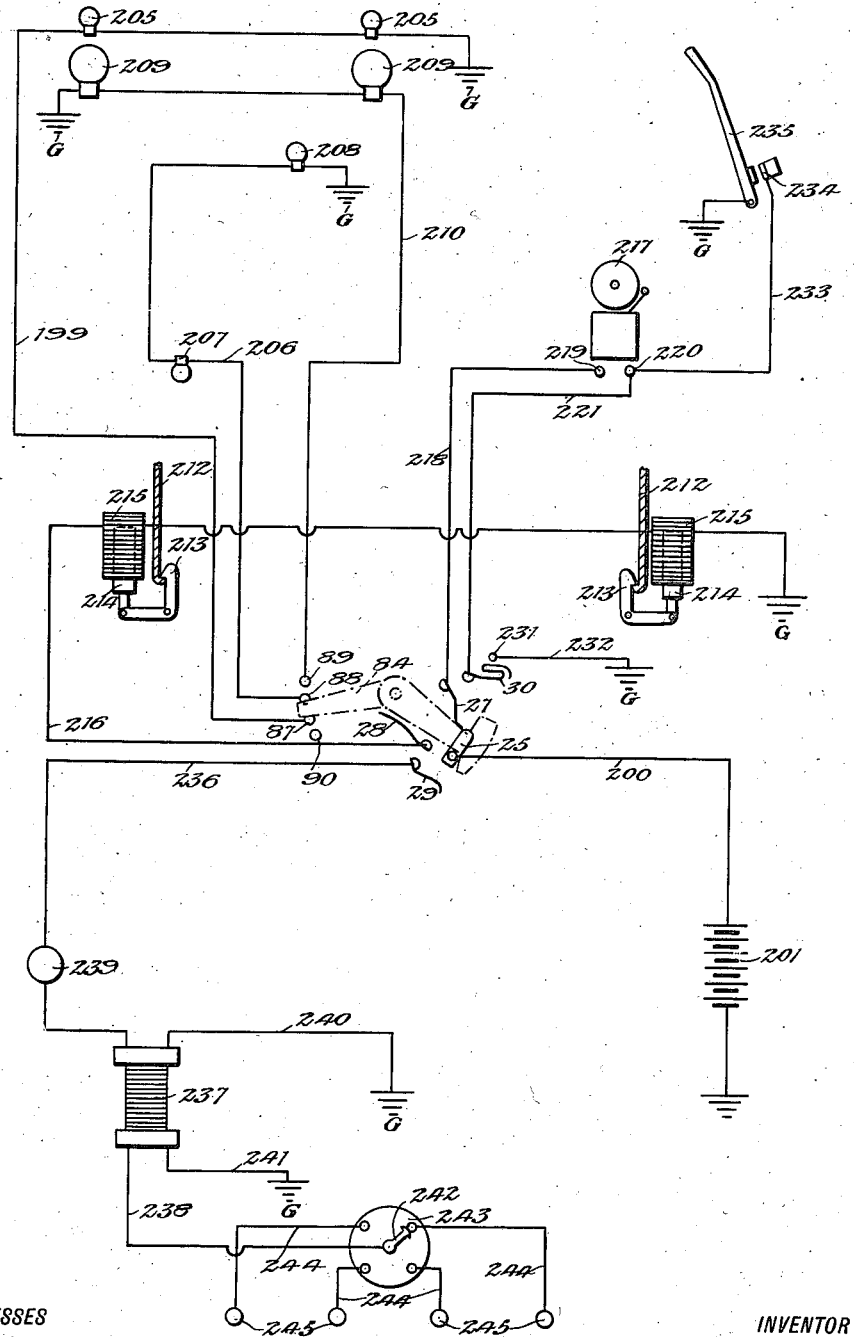

Patented Mar. 6, 1923.

1,447,946

UNITED STATES PATENT OFFICE.

HERMAN GOTTESMAN, OF NEW YORK, N. Y., ASSIGNOR TO IGNITION LOCK COMPANY OF AMERICA, INC., OF NEW YORK, N. Y., A CORPORATION OF NEW YORK.

MOTOR-VEHICLE-CONTROLLING SWITCH.

Application filed April 27, 1922. Serial No. 556,926.

*To all whom it may concern:*

Be it known that I, HERMAN GOTTESMAN, a citizen of Austria, and a resident of New York city, borough of the Bronx, in the county of Bronx and State of New York, have invented a new and Improved Motor-Vehicle-Controlling Switch, of which the following is a full, clear, and exact description.

The present invention relates to new and useful improvements in locks and alarms for motor vehicles, and it pertains more particularly to a device especially adapted for use in the ignition circuit of internal combustion motors employed in said vehicles.

It is one of the objects of the invention to provide a new and improved lock in which the ignition circuit of an internal combustion motor may be controlled at will.

It is a further object of the invention to provide a lock of the permutation type, which permutation lock serves to control the operation of a switch.

It is a further object of the invention to provide a permutation lock in which the combination is destroyed upon operation of the switch.

It is a further object of the invention to provide an electrically operated hood lock, the circuit of which is controlled by a permutation lock.

It is a further object of the invention to provide an alarm in combination with an electric switch in such a manner that upon an attempt by an unauthorized person to operate the switch the alarm will be sounded.

It is a further object of the invention to provide means whereby upon proper operation of the permutation lock the electric switch associated therewith will remain closed even though the combination of the permutation lock has automatically been destroyed, and until such a time as the switch is manually operated to open the same.

It is a further object of the invention to provide in combination with a switch and lock of the type mentioned, a supplemental switch for controlling the lighting of the vehicle or other device in connection with which the device is used.

It is a further object of the invention to provide a lock so associated with a switch that after the switch has been opened to break the circuit, it is prevented from again being operated without a correct operation of the lock.

It is a further object of the invention to combine a switch and an alarm in such a manner that the alarm will be operated by the movement of various parts of the machine by an unauthorized person, as, for example, the emergency brake lever.

It is a further object of the invention to so construct the lock, switch and alarm, that upon proper operation of the lock, the emergency brake lever may be operated without sounding the alarm.

It is a still further object of the invention to so construct the lock that any attempt to "feel" out the proper combination thereof will render the lock inoperative and cause a sounding of the alarm.

With the above and other objects in view, the invention contemplates a lock for motor vehicles in which the electric ignition circuit may be broken and maintained in broken condition by a permutation lock until such time as a proper operation of the lock will permit of a closing of said circuit. The invention further contemplates the adaptation of an alarm to the lock in such a manner that an improper operation of the lock will set up a sounding of the alarm until such a time as the lock is again correctly operated.

Reference is had to the accompanying drawings, in which—

Figure 3 is a view in elevation of the switch with the front plate removed;

Figure 4 is a plan view of the switch showing the front wall of the housing removed, the switch being in open position or the normal inoperative position;

Figure 5 is a similar view showing the switch in closed position;

Figure 6 is a plan view with certain of the switch parts removed;

Figure 7 is a detail bottom plan view of the swinging arm of the switch mechanism;

Figure 8 is a detail view showing the manner in which the alarm circuit is closed;

Figure 9 is a vertical sectional view of the switch taken on the line 9—9 of Fig. 4;

Figures 10 and 11 are detail views of the dials of the lock;

Figure 12 is a diagrammatic view of the wiring system of the switch and the various elements of a motor vehicle which the switch is employed to control.

Figure 1:
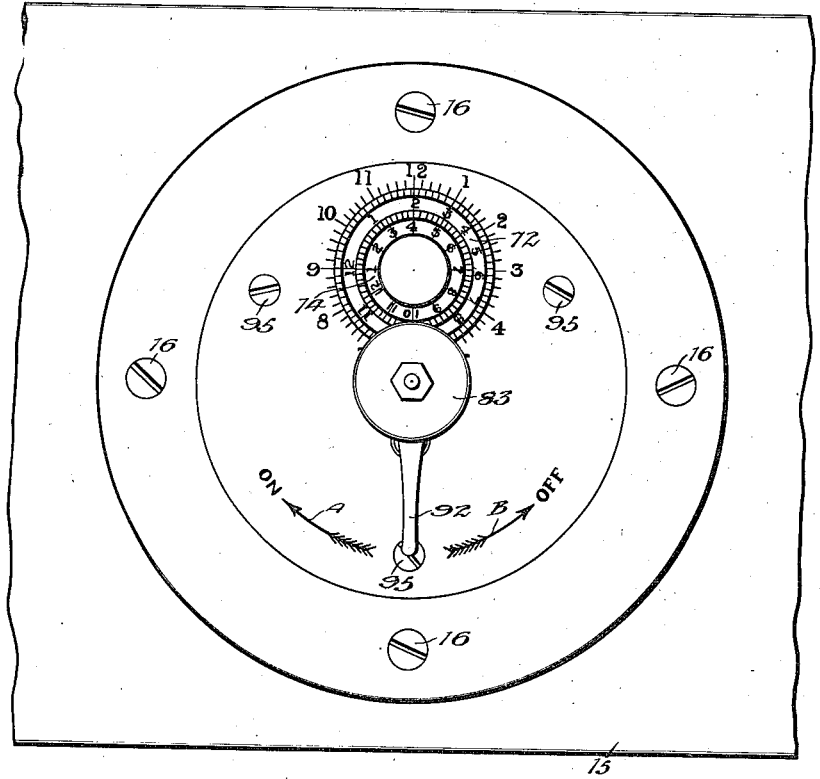
Figure 1 is a view in elevation of the controlling switch which is adapted to be mounted upon the instrument board of a motor vehicle.
Figure 2:
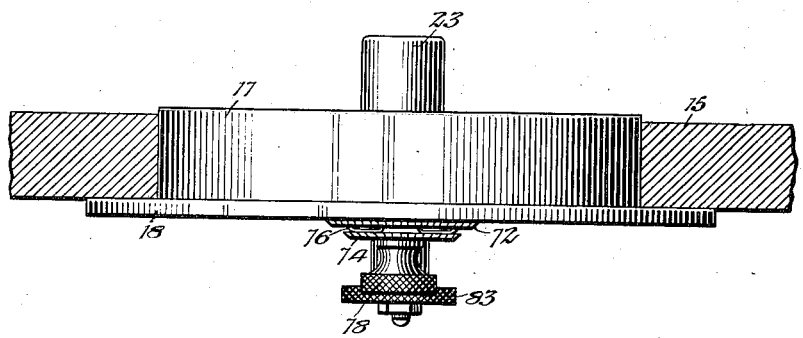
Figure 2 is a top plan view of the switch showing the instrument board in section.

Referring more particularly to the drawings, the reference character 15 designates the instrument board or other suitable portion of the vehicle to which the switch is adapted to be secured, said switch being secured in position by means of screws or other suitable fastening means 16.

The switch comprises a housing 17, the open side of which is closed by means of a plate 18, said plate being secured in position by means of screws 19 or the like. This plate 18 has a recessed portion 20, and lying in said recessed portion 20 is a plate 21, said plate 21 being secured in position by means of screws 22 or the like.

Extending into the housing 17, is a tubular member 23, which forms a positioning means or lead for the cable 200 leading from the battery 201 and shown in Figure 12 of the drawings. Secured to the interior of the housing 17 is a block of suitable insulating material 24, and carried by said block of insulating material 24 is a spring finger 25, to which the cable 200 leading from the battery 201 is connected. By this construction the spring finger 25 is at all times charged with electric current furnished by the battery 201. This non-conducting plate 24 is secured in position in the housing 17 by means of screws 26 or other suitable fastenings. The plate 24 of non-conducting material is provided with a plurality of spring fingers 27, 28, 29 and 30, each of said spring fingers forming one contact of the circuits which the switch is employed to control.

The housing 17 is formed with an opening 31, and mounted in said opening 31 is a stud 32. Mounted on said stud 32 and lying on the bottom wall of the housing 17 is a lever 33, said lever 33 having an extending arm 34 terminating in a curved portion 35. Secured to the end of the curved portion 35 is a finger 36, said finger being secured to the end curved portion 35 of the lever 33 by means of screws 37, and pins 38, or the like.

The reference character 39 designates a pin secured to the housing 17, and 40 designates a pin secured to the curved portion 35 of the lever 33. Connecting these pins 39 and 40, is a coil spring 41, by means of which the lever 33 is maintained in normal position, which position is shown in Fig. 6.

Pivotally secured as at 42, to the curved portion 35 of the lever 33, is a pawl 43, and said pawl 43 is adapted to be limited in its swinging movement by means of pins 44 and 45 mounted on the curved portion 35 of the lever 33. This pawl is adapted to be moved about its pivotal point 42 by means of pins 46 and 47, said pins 46 and 47 being carried by the housing 17. The arm 34 of the lever 33 carries a curved finger 48, and said curved finger has a flange 49, through which passes a plurality of fastening elements 50. This finger is adapted to co-operate with the permutation mechanism in a manner to be hereinafter more fully set forth.

Referring now to Figures 4 and 5, the reference character 51 designates a swinging T-shaped lever and said swinging T-shaped lever 51 is mounted to turn freely about the stud 32. This T-shaped lever 51 is insulated with respect to the stud 32 by a washer 52 of any suitable non-conducting material as is more clearly shown in Figure 9. This T-shaped lever 51 is adapted to overlie and at all times contact with the spring finger 25 heretofore mentioned in such a manner that the said T-shaped lever 51 will at all times be charged with electric current furnished by the battery 201.

Secured to the stud 32 is a rigid arm 53 and said rigid arm 53 has a projection 54 adapted to contact with a pin 55 carried by the flange 49 of the finger 48. This projection 54 when in engagement with the pin 55 is adapted to serve the means for rotating the lever 33 about its pivotal point. The T-shaped lever 51 is provided with a recess and mounted in said recess is a ball 56, said ball 56 being adapted to contact with either of the recesses 57 or 58 in the block 24 of insulating material. This ball 56 is maintained in its recess by means of a resilient member 60 secured by a screw 61, said resilient member 60 engaging the ball 56 and pressing it into either of the recesses 57 or 58 dependent upon the position of the T-shaped lever 51.

Pivotally secured to the T-shaped lever 51 and beneath the resilient member 60, is a substantially right-angular pawl 62, and said right-angular pawl 62 is normally maintained in the position shown in Figure 4 by means of a spring 63 secured in position by the screw 61, which serves to maintain the resilient member 60 in position on the T-shaped lever 51.

The reference character 64 designates a stud secured to the housing 17, and mounted on said stud is a shaft 65. This shaft 65 is formed on its lower end with a flange 66 and mounted on said flange 66 is a toothed wheel 67. This toothed wheel is secured to the shaft 65 in such a manner as to rotate therewith. Interposed between the toothed wheel 67 and the bottom wall of the housing 17, is a resilient washer 68, and said resilient washer 68 tends to force the toothed wheel 67 outwardly of the housing.

Surrounding the shaft 65 is a sleeve 69, and said sleeve 69 has rigidly secured thereto a toothed wheel 70, said toothed wheel being arranged in spaced relation to the toothed wheel 67. Interposed between the toothed wheel 70 and the plate 18, is a spring washer 71, and said spring washer 71 serves to force the toothed wheel 70 and the sleeve 69 inwardly of the housing 17. Secured to the sleeve 69 is a dial disk 72, and said dial disk 72 is provided with a plurality of spaced openings 73. Secured to the shaft 65 is a dial disk 74, said dial disk 74 being provided with a pin 75 adapted to engage one of the spaced openings 73 of the dial disk 72.

Interposed between the dial disks 72 and 74 is a resilient washer 76 adapted to maintain said dial disks normally in spaced relation. The outer end of the shaft 65 is provided with a reduced screw-threaded extension 77 and secured thereto is an operating knob 78, by means of which the shaft 65 and its dial disk 74 are rotated, it being understood that said shaft 65 has a squared portion 79 with which the dial disk 74 is engaged.

Each of the toothed wheels 67 and 70 heretofore mentioned is provided with a pin 80, and said pins are so positioned as to be out of alinement one with the other as shown in Figure 4. Each of these toothed wheels 67 and 70 is further provided with a cut-out portion or notch 81, the purpose of which will be hereinafter described.

Mounted on the stud 32 is a shaft 82, and the outer end of said shaft 82 is provided with an operating knob 83. Secured to the inner end of the shaft 82 is a resilient member 84, and said resilient member 84 forms one of the contacts of the lighting switch. This shaft 82 is mounted on a reduced extension 85 of the stud 32 and is adapted to freely rotate thereon to move the resilient member 84 in an arcuate path within the housing 17.

Mounted within the housing 17 is a block of insulating material 86 and said block of insulating material 86 carries three contacts 87, 88 and 89. The contact member 87 forms one of terminals of the dimmer light circuit 199, the dimmer lights being indicated by the reference character 205. The central contact 88 forms one of the terminals of the tail-and-dash light system designated by the reference character 206, the tail light being shown at 207 and the dash light being shown at 208. The third contact 89 forms one of the terminals for the head light circuit designated by the reference character 210, the headlights being designated by the reference character 209. The resilient member 84 is adapted to bridge two of these contacts at a time, that is regardless of whether the member engages either the contacts 87 or 89, it will simultaneously engage the contact 88. The reference character 90 designates a stop for limiting the movement of the resilient member 84 in a direction to the right in Fig. 4.

By reference to Fig. 9, it will be noted that the resilient member 84 is in contact with the T-shaped lever 51 and the current travels from said T-shaped lever 51 through the resilient member 84 and the contacts 87 to 89 dependent upon the position of the lever 84 to the several lighting circuits, each of said lighting circuits being grounded as indicated by the reference character G.

In Figure 12 the reference character 212 designates the hood of the vehicle and said hood is adapted to be maintained in its closed position by means of latches 213 or the like. These latches 213 are adapted to be operated to release the hood by means of the cores 214 of the solenoids 215. These solenoids are in the circuit 216 which leads from the resilient member 28 heretofore mentioned and is grounded as indicated at G in Figure 12.

The reference character 217 designates an alarm and one of the wires of the circuit of said alarm, designated by the reference character 218, leads from the resilient member 27 to the terminal 219 of said alarm. Leading from the other terminal 220 of said alarm is a wire 221 of the alarm circuit and said wire 221 is connected to the resilient member 30 heretofore mentioned. Adjacent the resilient member 30 is a pin 231, and leading from said pin 231 is a wire 232 grounded as indicated by the reference character G. Leading from the terminal 220 of the alarm 217 is a wire 233 having a terminal 234 mounted adjacent the emergency brake lever 235 and said emergency brake lever 235 is grounded as indicated by the reference character G.

Projecting through the plate 18 and as an integral part of the lever 53, is a tubular shaft 91, and secured to said tubular shaft 91 is a switch operating lever 92. This operating lever 92 forms the means by which the arm 53 is rocked in such a manner that its projection 54 will engage the pin 55 of the lever 33 to rock said lever about its pivotal point. This lever 53 is provided with an offset portion 93 and said offset portion is provided with an opening 94, the purpose of which will be hereinafter described. Secured to the rear face of the plate 18 by means of a screw 95, is a resilient member 96 and carried by the free end of said resilient member 96 is a pin 97, the outer end of which is provided with an operating head 98.

Referring again to Figure 12, it will be noted that leading from the resilient member 29, is a wire 236, and said wire leads to the coil 237 of the ignition system, the reference character 239 designating an interrupter placed in said circuit. The reference character 240 designates the primary winding of the coil 237, which primary winding of the coil is grounded as at G, while 241 designates the secondary winding, and said secondary winding is grounded as at G. The wire 238 connects with the rotor 242 of the distributor 243, and leading from said distributor 243 are wires 244, which in turn are connected to the spark plugs 245 of the motor.

The device operates in the following manner:

The several parts are shown in their normal inoperative position in Figure 4, with the exception of the toothed wheels 67 and 70, which toothed wheels, as shown in said figure, have their notches 81 in alinement one with the other and in position to receive the curved finger 48 carried by the lever 33, which is not the case when the several parts are in their true inoperative position as will hereinafter appear.

With the parts in their inoperative position, the operating knob 78 is grasped and depressed until the pin 75 on the dial disk 74 engages one of the openings 73 in the larger dial disk 72. When this has been done the larger dial disk 72 is rotated until its proper number coincides with the number "12" on the plate 21, which number coinciding with the number "12" will place the slot 81 in the toothed wheel 70 in the path of the curved finger 48. After this has been done the pressure on the knob 78 is released and permits the pin 75 to move out of engagement with the opening 73 with which it is engaged, this action being brought about by the influence of the resilient washer 76. After the pin has disengaged its opening, the operating knob 78 is rotated to rotate the dial disk 74 until the proper number thereon coincides with the number positioned opposite the number "12", to cause the cut-out portion 81 of the toothed wheel 67 to coincide with the cut-out 81 of the toothed wheel 70 in the path of travel of the curved finger 48. After this has been accomplished, the operating lever 92 is grasped and rotated to the "on" position, in the direction of the arrow A in Figure 1. As the lever is operated in this direction the curved finger 48 passes into the cut-out portions 81 of the toothed wheels 67 and 70, and during this movement the finger 36 secured to the curved portion 35 of the lever 33 will engage the pawl 62 and serve to move the T-shaped lever 51 from the position shown in Figure 4 to the position shown in Figure 5 where it contacts with the resilient member 29. As it contacts with the resilient member 29, the circuit is completed from the battery 201 through the wire 200, resilient member 25, T-shaped lever 51, resilient member 29, wire 236, to the ignition system, thus closing the ignition system of the vehicle. Upon this movement of the T-shaped lever 51, its ball 56 will drop into the recess 57 in the block 24 of insulating material and retain said T-shaped lever in the circuit closing position. When the operating lever 92 has been released, under the influence of the spring 41 the lever 33 will be returned to its normal position without, however, effecting an opening of the switch or disengagement of the T-shaped lever 51 from the resilient member 29.

To open the ignition circuit it is only necessary to swing the operating lever 92 in the direction of the arrow B in Figure 1, to the "off" position, which action causes the rigid arm 53 to engage a stud 110 carried by the T-shaped lever 51, which engagement causes the lever 51 to rock about its pivotal point until its pawl 56 engages in the recess 58, thus breaking the circuit and maintaining the T-shaped lever 51 in circuit-breaking position.

Simultaneously with the closing of the circuit, the pivoted pawl 43 engages the pin 47, as shown in Fig. 5 and said pawl is rocked into engagement with the pin 44. As the lever 33 returns to its normal position, this pawl will engage the pins 80 carried by the toothed wheels 67 and 70 and will give said toothed wheels a partial rotation, so that their cut-out portions 81 will no longer register with the path of travel of the curved finger 48, thus preventing a further operation of the switch until the combination has been properly set to move the cut-out portions 81 of the disks 67 and 70 into the path of travel of the curved finger 48.

The foregoing describes the manner in which the ignition circuit is closed and also sets forth the manner in which the combination of the lock is automatically destroyed upon each operation of the lock and clearly sets forth the mechanism by which a complete setting of the combination lock elements is necessary upon each operation of the switch.

Assuming now that the cut-out portions 81 of the toothed wheels 67 and 70 are not in the path of travel of the curved finger 48, and the operating lever 92 is grasped and moved to the left in the direction of the arrow A in Fig. 1, towards the "on" position: Upon movement of this lever in this direction the end of the curved finger 36 will engage the pawl 62 and rock the pawl so that it will in turn engage the resilient member 30 and force the same into contact with the pin 231. By reference to Fig. 12 it will be apparent that this operation will ground the alarm circuit and will cause a ringing of the alarm. Owing to the fact that the pawl is right-angular in form, the several parts will be maintained in this position and the alarm circuit will be grounded, thus causing a constant ringing of the alarm until the combination is set to permit of movement of the T-shaped lever 51 to a position where the pawl 62 will be carried out of contact with the resilient member 30 and will permit said resilient member 30 to move under the influence of its own resiliency out of contact with the pin 231 to break the alarm circuit.

It is to be understood, of course, that the resilient member 27 is in contact with the T-shaped lever 51 and furnishes the current for the alarm circuit and that upon movement of the T-shaped lever 51 out of contact with the resilient member 27, which is permitted by a proper setting of the combination, the circuit of the alarm will be automatically broken.

To prevent an operation of the alarm circuit when the parts are set in their inoperative position, a curved finger 36 is provided with an insulated pin 36' which engages the resilient member 30 and presses in said resilient member between the pin 36' and the end of the right-angular pawl 62, thus preventing engagement of the resilient member 30 with the pin 231.

With the parts in the position shown in Figure 4, if one unfamiliar with the switch and the system were to enter the motor vehicle and in any manner tamper with the emergency brake 235, the circuit 233 of the alarm would be grounded and a sounding of the alarm will be set up.

Assuming now that it is desired to raise the hood of the motor vehicle, which hood is normally maintained closed by the latches 213 controlled by the cores 214 of the solenoids 215: The combination is set so that the cut-out portions 81 of the toothed wheels 67 and 70 will be in the path of travel of the curved finger 48, and as said curved finger 48 passes into the cut-out portions 81 of the toothed wheels 67 and 70, the resilient member 28 will be moved into contact with the T-shaped member 51 by means of an insulated pin 52' carried by the lever 33, as indicated at X in Figure 5, thus completing the circuit 216 in Figure 12 to the solenoids 215 and operating said solenoids to release the hood latches 213. When the parts have been moved to this position, the opening 94 in the offset portion 93 will be directly in alinement with the pin 97 and upon depressing said pin 97 it will enter said opening and hold the several parts in the position where the hood may be opened and closed at will. It will be apparent, however, that this cannot be done unless the proper combination of the permutation lock be known and the elements of said lock set to the true position.

When it is desired to operate the lights, it is only necessary to grasp the operating member 83 and rotate the same so that the motor 84 will engage either the contacts 87 and 88, or 88 and 89. In the first position, that is, when the motor 84 engages the contacts 87 and 88, the dimmers 205, the tail light 207, and the dash light 208, will be illuminated. When, however, the motor 84 engages the contacts 88 and 89, the tail light 207, dash light 208, and head lights 209 will be illuminated.

From the foregoing it is apparent that the present invention provides a new and improved controlling lock for motor vehicles in which the lighting switch and ignition switch are contained within a single controlling mechanism. Furthermore, the mechanism provides means whereby upon tampering with the lock by an unauthorized person or one unfamiliar with the mechanism, an alarm will be sounded, which alarm will sound constantly until the lock is operated by one familiar therewith.

Various slight changes might be made in the general form and arrangement of the parts described without departing from the invention, and hence I do not limit myself to the precise details set forth but consider myself at liberty to make such changes and alterations as fairly fall within the spirit and scope of the appended claims.

What is claimed is:

1. In a lock of the type set forth, an electric switch, a switch operating mechanism, means for operating the switch operating mechanism, and a permutation lock mechanism adapted when set to permit of operation of the switch operating mechanism, said permutation lock mechanism being automatically moved to unset position upon each operation of the switch operating mechanism.

2. In a lock of the type set forth, an electric switch, a mechanism for operating said switch, means adapted to be set to permit of operation of the switch operating mechanism, said last-mentioned means being automatically moved to unset position upon each operation of the switch operating mechanism.

3. In a control lock for an electric circuit, a switch in said circuit, a manually operated mechanism for closing said switch, and a permutation mechanism, said permutation mechanism permitting an operation of the switch when in one of its adjusted positions, and moving automatically to position where it will prevent operation of the switch operating mechanism to close the switch upon each operation of the switch operating mechanism.

4. In a control lock for an electric circuit, a switch in the circuit, a switch actuating mechanism adapted to close said switch and return to normal position without opening said switch, separate means for opening said switch, and means for preventing a subsequent operation of the switch actuating mechanism.

5. In a control lock for an electric circuit, a switch in said circuit, a manually operated mechanism for operating said switch, and permutation means which upon each operation of the switch operating mechanism automatically renders said switch operating mechanism inoperative until the combination of said permutation means is reset without, however, breaking the electric circuit closed by the operation of the switch-operating mechanism.

6. The combination with an electric switch, of a permutation lock, and means for automatically and irregularly destroying the combination of said permutation lock upon operation of the electric switch.

7. An electric switch, means for operating said electric switch, a permutation lock for controlling said switch-operating means, and means for automatically destroying the combination of said permutation lock upon each operation of the switch-operating means.

8. An electric switch, manually operated means for operating the switch to close an electric circuit, said switch remaining closed after manual operation has ceased, and means for preventing a subsequent operation of the switch.

9. In a combination lock switch, a housing, a post carried by the housing, an arm pivotally mounted on said post and constituting an electric switch, a second arm mounted upon said post and independent of the arm constituting the switch, said second arm being adapted for movement into engagement with the switch arm to move the latter to circuit-closing position, means for operating said second-mentioned arm, and means for preventing further operation of said second mentioned arm.

10. In a combination lock switch, a swinging arm constituting a circuit-closing member, a second arm adapted to move into engagement with said first-mentioned arm to move the same to circuit-closing position, means for operating said second-mentioned arm to move the first-mentioned arm to circuit-closing position, means for returning the second-mentioned arm to normal position without effecting a movement of the first-mentioned arm, and means for preventing a subsequent operation of said second mentioned arm.

11. In a combination lock switch, an electric switch comprising a housing, a post mounted in said housing, an arm pivotally mounted on said post, and constituting an electric switch-closing element, a curved arm mounted on said post independently of said switch arm, said curved arm being adapted to move the switch arm to circuit-closing position and return to normal position without effecting a movement of said switch arm, manually-operated means for moving said curved arm into engagement with the switch arm, said manually-operated means also serving to move the switch arm out of circuit-closing position, and automatically operated means for preventing a subsequent operation of the curved arm to move the switch arm to circuit closing position.

12. A control lock for electric circuits comprising in combination with a switch in said circuit, means for engaging said switch to move the same to closed position, means for maintaining said switch in closed position after the switch-engaging means has returned to its normal position, manually operated means for moving the switch to open position independently of the means which serves to move the switch to closed position, and automatically operated means for preventing a subsequent movement of said switch to circuit closing position.

13. In a control lock for electric circuits, an electric switch in said circuit, an operating means for said electric switch comprising a pivotally mounted arm, manually operated means for moving said arm into engagement with the switch to move the switch to closed position when said manually operated means is operated in one direction, means operated by the said manually operated means for moving the switch to open position upon movement of the manually operated means in the opposite direction, and means for preventing a subsequent operation of the pivotally mounted arm to prevent moving the switch to circuit closing position.

HERMAN GOTTESMAN.